United States Patent
Ihara (10) Patent No.: US 8,400,758 B2
(45) Date of Patent: Mar. 19, 2013

(54) SOLID ELECTROLYTIC CAPACITOR AND A METHOD FOR MANUFACTURING THE SAME

(75) Inventor: Hayatoshi Ihara, Kyotanabe (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 158 days.

(21) Appl. No.: 12/847,230

(22) Filed: Jul. 30, 2010

(65) Prior Publication Data

US 2011/0032662 A1 Feb. 10, 2011

(30) Foreign Application Priority Data

Aug. 6, 2009 (JP) ................. 2009-182940

(51) Int. Cl.
*H01G 4/228* (2006.01)
*H01G 9/00* (2006.01)
(52) U.S. Cl. ...................... 361/540; 29/25.03
(58) Field of Classification Search .......... 361/540, 361/538, 533; 29/25.03
See application file for complete search history.

(56) References Cited

U.S. PATENT DOCUMENTS

| | | | | |
|---|---|---|---|---|
| 7,135,754 B2* | 11/2006 | Sano et al. | ............ | 257/528 |
| 7,295,426 B2* | 11/2007 | Ihara | ............ | 361/523 |
| 8,072,735 B2* | 12/2011 | Fujii et al. | ............ | 361/540 |
| 8,075,640 B2* | 12/2011 | Marek et al. | ............ | 29/25.03 |
| 2007/0081301 A1* | 4/2007 | Tanaka | ............ | 361/540 |

FOREIGN PATENT DOCUMENTS

JP 2008-091784 A 4/2008

* cited by examiner

*Primary Examiner* — Eric Thomas
(74) *Attorney, Agent, or Firm* — Westerman, Hattori, Daniels & Adrian, LLP (57) ABSTRACT

A solid electrolytic capacitor according to the present invention includes a solid electrolyte type capacitor element including a dielectric layer intervening between an anode section and a cathode section, an anode terminal connected electrically to the anode section of the capacitor element through a pad member, and a cathode terminal connected electrically to the cathode section of the capacitor element. Here, on facing surfaces of the pad member and the anode terminal, a joint part which joins the pad member and the anode terminal electrically is formed at a position adjacent to a first lateral surface of the pad member located on the cathode terminal side, and a second lateral surface of the pad member on the opposite side to the first lateral surface and a partial area of a lateral end surface of the anode terminal are flush with each other.

5 Claims, 5 Drawing Sheets

SOLID ELECTROLYTIC CAPACITOR AND A METHOD FOR MANUFACTURING THE SAME

The Japanese application Number 2009-182940, upon which this patent application is based, is hereby incorporated by reference.

BACKGROUND OF THE INVENTION

1. Field of the Invention

The present invention relates to a solid electrolytic capacitor and a method for manufacturing same, and particularly to a solid electrolytic capacitor in which an anode section of a capacitor element is electrically connected to an anode terminal through a pad member and a method for manufacturing same.

2. Description of Related Art

Figure 9:
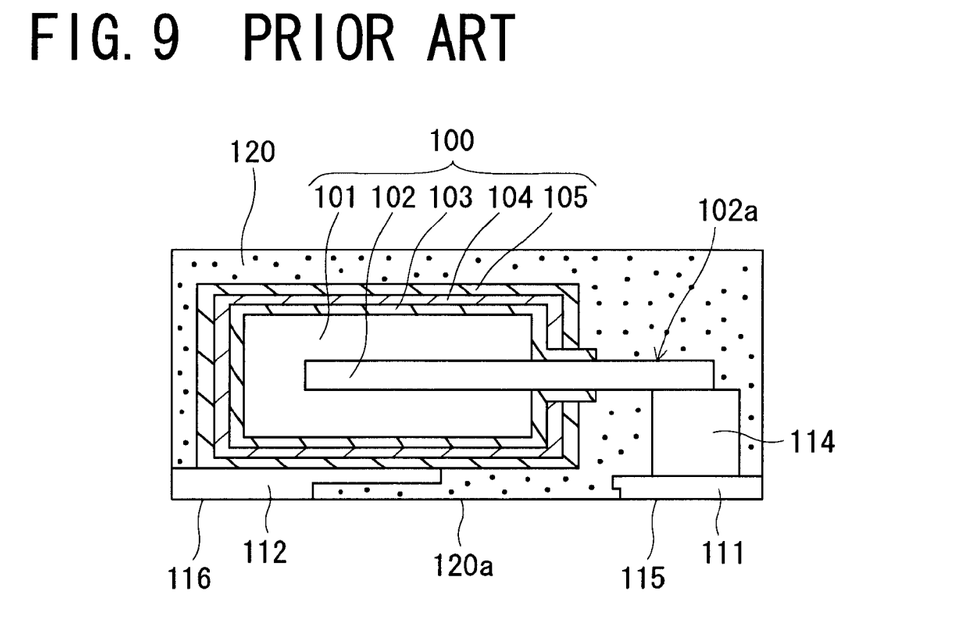
FIG. 9 is a cross sectional view showing a conventional solid electrolytic capacitor.

FIG. 9 is a cross sectional view of a conventional solid electrolytic capacitor. As shown in FIG. 9, the conventional solid electrolytic capacitor comprises a solid electrolyte type capacitor element 100, an anode terminal 111, and a cathode terminal 112, which are buried in an enclosure resin 120. The capacitor element 100 has a dielectric layer 103 formed on a surface of an anode body 101 in which an anode lead 102 is planted, an electrolyte layer 104 formed on the dielectric layer 103, and a cathode layer 105 formed on the electrolyte layer 104.

The anode terminal 111 and the cathode terminal 112 include an anode terminal surface 115 and a cathode terminal surface 116, respectively, which are exposed on a lower surface 120a of the enclosure resin 120. To a surface of the anode terminal 111 on the opposite side to the anode terminal surface 115, joined electrically is a pad member 114 by welding means such as laser welding or resistance welding. A tip end part 102a of the anode lead 102 of the capacitor element 100 is electrically connected to an end part of the pad member 114. To a surface of the cathode terminal 112 on the opposite side to the cathode terminal surface 116, electrically connected is a part of a surface of the cathode layer 105 of the capacitor element 100.

Figure 10:
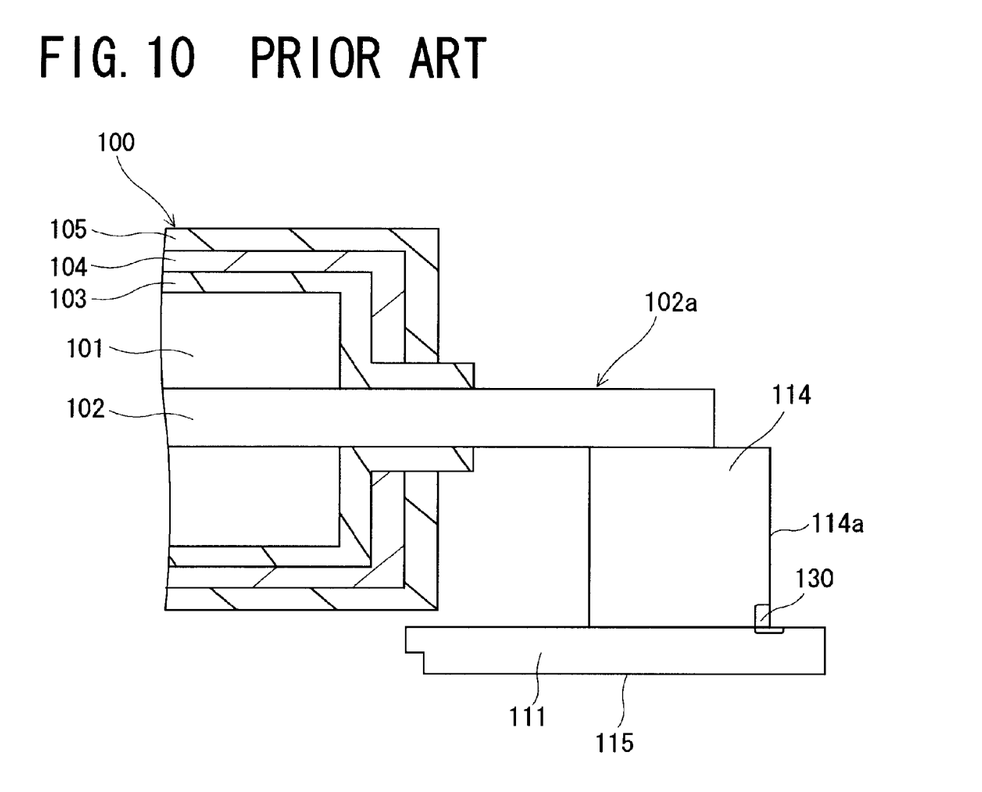
FIG. 10 is a cross sectional view showing an essential part of the conventional solid electrolytic capacitor in an enlarged manner.

However, in a case where the pad member 114 is joined to the anode terminal 111 by laser welding, conventionally, as shown in FIG. 10, the laser welding is performed on facing surfaces of the pad member 114 and the anode terminal 111 at a position adjacent to a lateral surface 114a of the pad member 114 located on the opposite side to the cathode terminal 112, thereby forming a joint part 130 of the pad member 114 and the anode terminal 111.

Also, in a case where the pad member 114 is joined to the anode terminal 111 by resistance welding, it was not possible to specify a position of the joint part 130 formed on the facing surfaces of the pad member 114 and the anode terminal 111.

Therefore, in a case of performing a cutting process on the pad member 114 in order to decrease the size of the pad member 114 to increase a space factor of the capacitor element 100, the joint part 130 of the pad member 114 and the anode terminal 111 might be cut off, and therefore, a poor electric connection might occur between the pad member 114 and the anode terminal 111.

Therefore, in a conventional solid electrolytic capacitor, in order to maintain a good electric connection between the pad member 114 and the anode terminal 111, the pad member 114 is buried in the enclosure resin 120 without performing a cutting process on the pad member 114 which is joined to the anode terminal 111 as shown in FIG. 9. Because of this, there has been a problem of decrease in the space factor of the capacitor element 100 in the conventional solid electrolytic capacitor.

SUMMARY OF THE INVENTION

In view of the above described problems, an object of the present invention is to provide a solid electrolytic capacitor with a high space factor of the capacitor element and a good electrical connection between the pad member and the anode terminal, and a method for manufacturing same.

A first solid electrolytic capacitor according to the present invention comprises a solid electrolyte type capacitor element including a dielectric layer intervening between an anode section and a cathode section, an anode terminal connected electrically to the anode section of the capacitor element through a pad member, and a cathode terminal connected electrically to the cathode section of the capacitor element. Here, on facing surfaces of the pad member and the anode terminal, a joint part which joins the pad member and the anode terminal electrically is formed at a position adjacent to a first lateral surface of the pad member located on the cathode terminal side, and a second lateral surface of the pad member on the opposite side to the first lateral surface and a partial area of a lateral end surface of the anode terminal are flush with each other.

By joining a pad forming member which is to be the pad member to an anode frame which is to be the anode terminal, and thereafter performing a cutting process on the pad forming member and the anode frame to cut off end parts thereof on the opposite side to the cathode terminal, the anode terminal and the pad member of the above described first solid electrolytic capacitor are produced. Therefore, the second lateral surface of the pad member and the lateral end surface of the anode terminal are flush with each other on a cutting plane formed in the cutting process. Because the joint part of the pad member and the anode terminal is formed at the position adjacent to the first lateral surface of the pad member, the joint part is not cut off in the cutting process, and remains at the position adjacent to the first lateral surface of the pad member.

Since the pad member is formed by performing the cutting process on the pad forming member in this way, the pad member has a small size. Therefore, in the above described first solid electrolytic capacitor, a space factor of the capacitor element improves. Moreover, because the pad member is joined to the anode terminal electrically through the joint part, a good electric connection between the pad member and the anode terminal is obtained.

A second solid electrolytic capacitor according to the present invention is the first solid electrolytic capacitor described above, wherein the joint part is formed by performing laser welding on the facing surfaces of the pad member and the anode terminal at the position adjacent to the first lateral surface of the pad member.

A first method for manufacturing a solid electrolytic capacitor according to the present invention comprises a joining step, a mounting step, and a cutting step. Here, the solid electrolytic capacitor comprises a solid electrolyte type capacitor element including a dielectric layer intervening between an anode section and a cathode section, an anode terminal connected electrically to the anode section of the capacitor element through a pad member, and a cathode terminal connected electrically to the cathode section of the capacitor element.

In the joining step, a pad forming member which is to be the pad member is provided on an anode frame which is to be the anode terminal, and thereafter the anode frame and the pad forming member are joined by forming a joint part on facing surfaces of the pad forming member and the anode frame at a position adjacent to a lateral surface of the pad forming member on a cathode frame side. Here the cathode frame is to be the cathode terminal.

In the mounting step, after performing the joining step, the capacitor element is mounted on the anode frame and the cathode frame, and thereafter the anode section of the capacitor element is connected to a tip end part of the pad forming member, and the cathode section of the capacitor element is connected to the cathode frame.

In the cutting step, after performing the mounting step, an end part of the pad forming member on the opposite side to the cathode frame is cut off to form the pad member.

In the above described first manufacturing method, because the joint part of the pad forming member and the anode frame is formed at the position adjacent to the lateral surface of the pad forming member on the cathode frame side, even when the end part of the pad forming member on the opposite side to the cathode frame is cut off, the joint part is not cut off. Therefore, the pad member formed by performing the cutting step is kept connected electrically to the anode terminal which is formed from the anode frame through the joint part. Moreover, because the pad member is formed by cutting the pad forming member, the size of the pad member is smaller than that of the pad forming member.

Thus, according to the first manufacturing method described above, a space factor of the capacitor element improves in the produced solid electrolytic capacitor. Moreover, a good electric connection between the pad member and the anode terminal is obtained.

A second method for manufacturing a solid electrolytic capacitor according to the present invention is the first manufacturing method described above, wherein in the cutting step, when cutting the end part of the pad forming member on the opposite side to the cathode frame, the pad forming member and the anode frame are cut along the same plane to form the pad member and the anode terminal.

A third method for manufacturing a solid electrolytic capacitor according to the present invention is the first or second manufacturing method described above, wherein in the joining step, the joint part is formed by performing laser welding on the facing surfaces of the pad forming member and the anode frame at the position adjacent to the lateral surface of the pad forming member on the cathode frame side.

DETAILED DESCRIPTION OF THE PREFERRED EMBODIMENT

A preferred embodiment of the present invention is discussed in detail below with reference to drawings.

Figure 1:
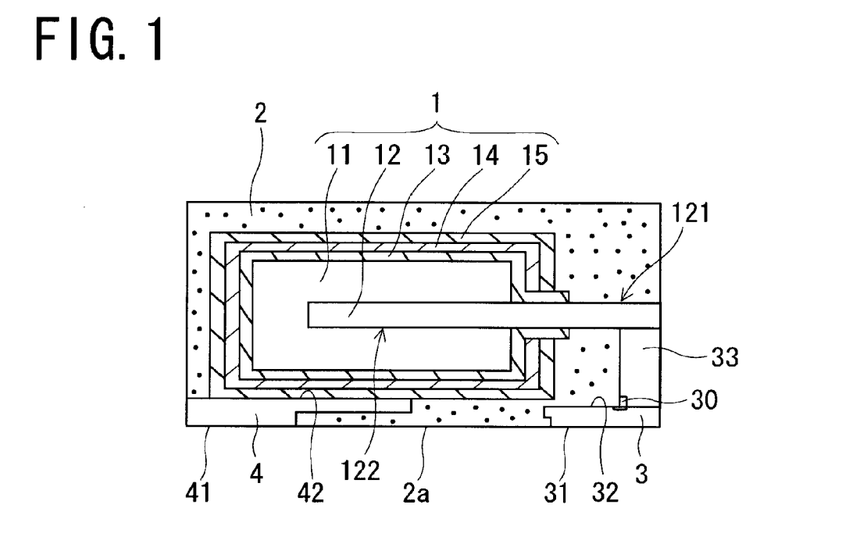
FIG. 1 is a cross sectional view showing a solid electrolytic capacitor according to an embodiment of the present invention.

FIG. 1 is a cross sectional view showing a solid electrolytic capacitor according to an embodiment of the present invention. As shown in FIG. 1, the solid electrolytic capacitor of this embodiment comprises a capacitor element 1, an anode terminal 3, and a cathode terminal 4, which are buried in an enclosure resin 2. The capacitor element 1 is lead type and electrolyte type.

The capacitor element 1 has an anode body 11 in which an anode lead 12 is planted, a dielectric layer 13 formed on a surface of the anode body 11, an electrolyte layer 14 formed on the dielectric layer 13, and a cathode layer 15 formed on the electrolyte layer 14.

Here, the anode body 11 is formed by a porous sintered body made of a valve metal, for which employed is a metal such as tantalum, niobium, titanium, or aluminum.

The anode lead 12 includes a base end part 122 buried in the anode body 11, and a tip end part 121 extracted from a surface of the anode body 11. The anode lead 12 is made of a valve metal which is the same kind as or different kind from the valve metal which forms the anode body 11, and the anode body 11 and the anode lead 12 are electrically connected to each other.

The dielectric layer 13 is an oxide film formed on the surface of the anode body 11, and the oxide layer is formed by immersing the anode body 11 in an electrolytic solution such as phosphate aqueous solution or adipic acid aqueous solution to oxidize the surface of the anode body 11 electrochemically (anodic oxidation).

The electrolyte layer 14 is formed on the dielectric layer 13, using an electrically-conductive inorganic material such as manganese dioxide, or an electrically-conductive organic material such as TCNQ (Tetracyano-quinodimethane) complex salt or electrically-conductive polymer.

The cathode layer 15 is formed by a carbon layer (not shown) formed on the electrolyte layer 14 and a silver paste layer (not shown) formed on the carbon layer, and the electrolyte layer 14 and the cathode layer 15 are electrically connected to each other.

In the capacitor element 1 described above, the anode body 11 and the anode lead 12 form an anode section of the capacitor element 1, while the electrolyte layer 14 and the cathode layer 15 form a cathode section of the capacitor element 1.

The anode terminal 3 and the cathode terminal 4 include an anode terminal surface 31 and a cathode terminal surface 41, respectively, which are exposed from a lower surface 2a of the enclosure resin 2. The anode terminal surface 31 and the cathode terminal surface 41 form a pair of lower surface electrodes of the solid electrolytic capacitor.

The anode terminal 3 and the cathode terminal 4 are each formed by performing a plating process on a surface of a terminal forming member (not shown) which is made of copper and is a base material of the terminals to form a plating layer (not shown) including a nickel layer, a palladium layer, and a gold layer. Various metals other than copper can be used as a material of the terminal forming member. Also, various metals other than nickel, palladium, and gold can be used as a material of the plating layer.

A pad member 33 is arranged on a surface 32 of the anode terminal 3 on the opposite side to the anode terminal surface 31. On facing surfaces of the pad member 33 and the anode terminal 3, as shown in FIG. 2, formed is a joint part 30 electrically joining the pad member 33 and the anode terminal 3 at a position adjacent to a first lateral surface 33a of the pad member 33 located on the cathode terminal 4 side.

Here, the joint part 30 is formed by performing laser welding on the facing surfaces of the pad member 33 and the anode terminal 3 at a position adjacent to the first lateral surface 33a of the pad member 33. Specifically, a part of the plating layer of the anode terminal 3 and a part of the pad member 33 are melted and integrated to form the joint part 30. The pad member 33 is formed using a metal such as iron (42 alloy), nickel, or tantalum.

Figure 2:
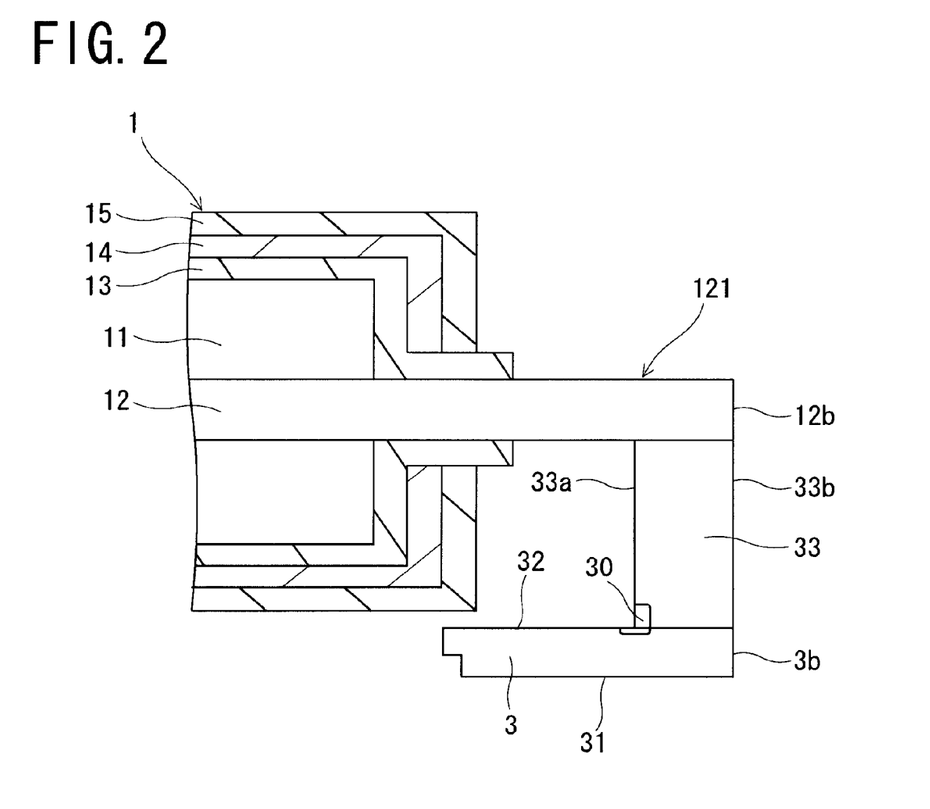
FIG. 2 is a cross sectional view showing an essential part of the solid electrolytic capacitor in an enlarged manner.

Also, in the above described solid electrolytic capacitor, as shown in FIG. 2, a tip end surface 12b of the anode lead 12, a second lateral surface 33b of the pad member 33 on the opposite side to the first lateral surface 33a, and a partial area 3b of a lateral end surface of the anode terminal 3 are flush with each other. On the second lateral surface 33b of the pad member 33 and the tip end surface 12b of the anode lead 12, formed is a coating layer (not shown) including an insulation material.

As shown in FIG. 1, the above described capacitor element 1 is mounted on the anode terminal 3 and the cathode terminal 4. The tip end part 121 of the anode lead 12 of the capacitor element 1 is adhered to the tip end part of the pad member 33 by laser welding, and a part of the surface of the cathode layer 15 is bonded by a conductive adhesive to a surface 42 of the cathode terminal 4 on the opposite side to the cathode terminal surface 41. The anode section of the capacitor element 1 is thereby electrically connected to the anode terminal 3 through the pad member 33, and the cathode section of the capacitor element 1 is electrically connected to the cathode terminal 4 through the conductive adhesive.

A manufacturing method of the above described solid electrolytic capacitor is explained below.

Figure 3:
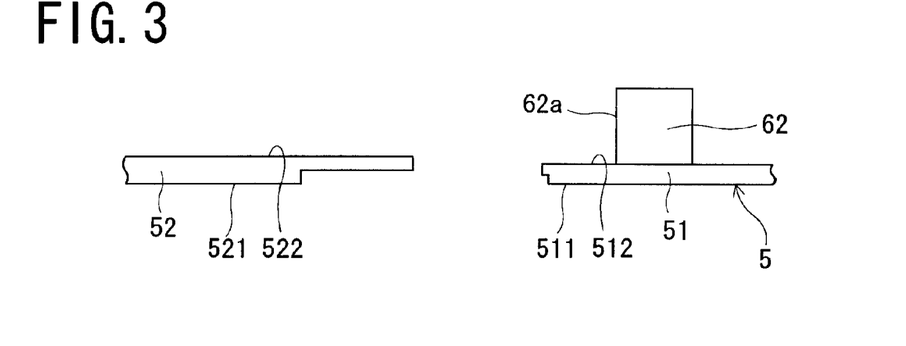
FIG. 3 is a cross sectional view for explaining a first phase of a joining step of a manufacturing method of the solid electrolytic capacitor.
Figure 4:
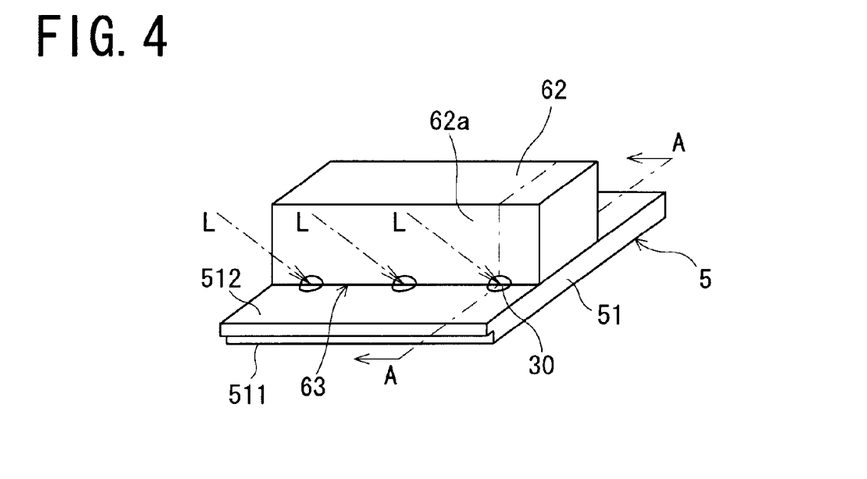
FIG. 4 is a perspective view for explaining a latter phase of the joining step.

FIG. 3 is a cross sectional view for explaining a first phase of a joining step of a manufacturing method of the solid electrolytic capacitor. FIG. 4 is a perspective view for explaining a latter phase of the joining step. And FIG. 5 is a cross sectional view along the line A-A shown in FIG. 4.

First, as shown in FIG. 3, in the first phase of the joining step, prepared is a frame body 5 which includes an anode frame 51 which is to be the anode terminal 3 and a cathode frame 52 which is to be the cathode terminal 4. Then a pad forming member 62 which is to be the pad member 33 is placed on an upper surface 512 of the anode frame 51 of the frame body 5. The pad member 33 is formed using a metal such as iron (42 alloy), nickel, or tantalum.

Here, the anode frame 51 and the cathode frame 52 are each formed by performing a plating process on a surface of a frame forming member (not shown) which is made of copper and is a base material of the frames to form a plating layer (not shown) including a nickel layer, a palladium layer, and a gold layer. Various metals other than copper can be used as a material of the frame forming member. Also, various metals other than nickel, palladium, and gold can be used as a material of the plating layer.

Figure 5:
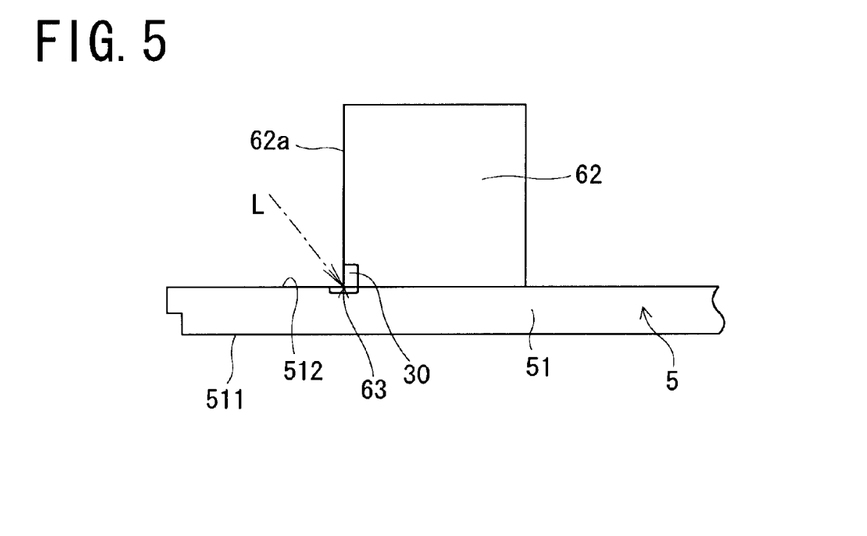
FIG. 5 is a cross sectional view along the line A-A shown in FIG. 4.

Subsequently in the latter phase of the joining step as shown in FIGS. 4 and 5, irradiated with a laser beam L is a corner part 63 formed by a lateral surface 62a of the pad forming member 62 on the cathode frame 52 side and the upper surface 512 of the anode frame 51. A part of the plating layer of the anode frame 51 and a part of the pad forming member 62 are thereby melted and integrated at a position adjacent to the lateral surface 62a of the pad forming member 62.

As a result, on the facing surfaces of the pad forming member 62 and the anode frame 51, formed is the joint part 30 that joins the anode frame 51 and the pad forming member 62 at the position adjacent to the lateral surface 62a of the pad forming member 62, and the pad forming member 62 and the anode frame 51 are electrically connected to each other through the joint part 30.

Figure 6:
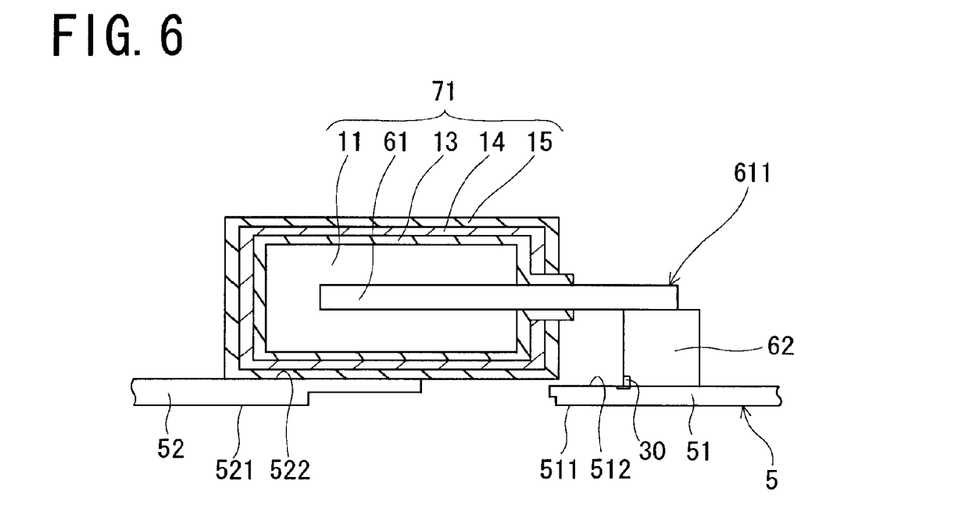
FIG. 6 is a cross sectional view for explaining a mounting step of the manufacturing method.

FIG. 6 is a cross sectional view for explaining a mounting step of the manufacturing method of the solid electrolytic capacitor. The mounting step is performed after performing the joining step. As shown in FIG. 6, in the mounting step, a capacitor element body 71 which is to be the capacitor element 1 is mounted on the frame body 5. The capacitor element body 71 is an element having the anode body 11, a lead forming member 61 which is to be the anode lead 12 planted in the anode body 11, the dielectric layer 13 formed on the surface of the anode body 11, the electrolyte layer 14 formed on the surface of the dielectric layer 13, and the cathode layer 15 formed on the surface of the electrolyte layer 14.

When mounting the capacitor element body 71 on the frame body 5, a tip end part 611 of the lead forming member 61 of the capacitor element body 71 is brought into contact with a tip end part of the pad forming member 62, and laser welding is performed on the contact surface to fix the tip end part 611 of the lead forming member 61 to the tip end part of the pad forming member 62. The lead forming member 61 and the pad forming member 62 are thereby connected to each other electrically.

Concurrently, a part of the surface of the cathode layer 15 of the capacitor element body 71 is bonded to an upper surface 522 of the cathode frame 52 using a conductive adhesive. The cathode layer 15 and the cathode frame 52 are thereby connected to each other electrically.

Figure 7:
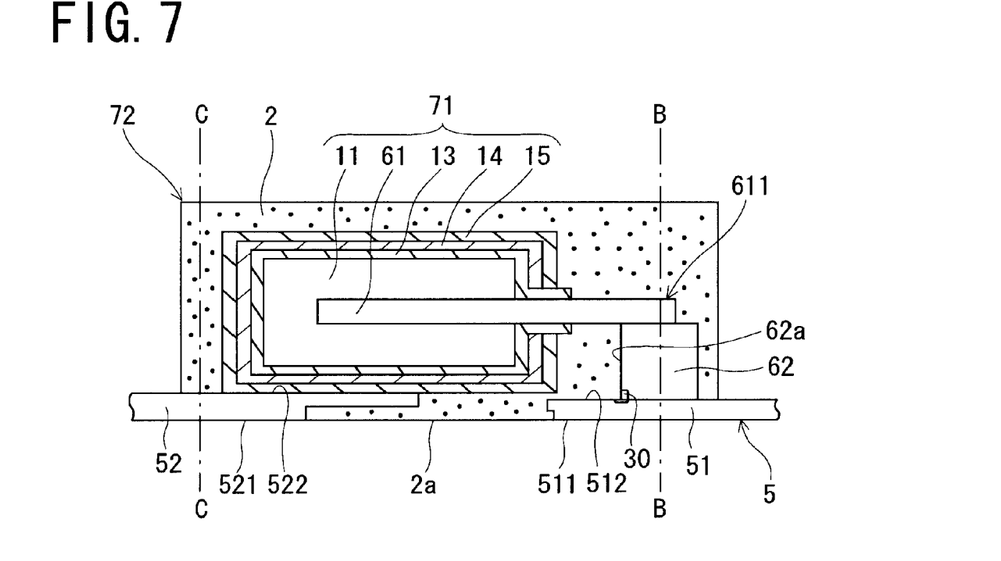
FIG. 7 is a cross sectional view for explaining an enclosure resin forming step and a cutting step of the manufacturing method.

FIG. 7 is a cross sectional view for explaining an enclosure resin forming step and a cutting step of the manufacturing method of the solid electrolytic capacitor. The enclosure resin forming step is performed after performing the mounting step. As shown in FIG. 7, in the enclosure resin forming step, the enclosure resin 2 is formed around the capacitor element body 71, thereby burying the capacitor element body 71, the pad forming member 62, the anode frame 51 and the cathode frame 52 in the enclosure resin 2. At this time, a lower surface 511 of the anode frame 51 and a lower surface 521 of the cathode frame 52 are exposed from a lower surface 2a of the enclosure resin 2. Thus, a block body 72 is produced in the enclosure resin forming step.

The cutting step is performed after performing the enclosure resin forming step. As shown in FIG. 7, in the cutting step, the block body 72 produced in the enclosure resin forming step is subjected to a cutting process. Specifically, the block body 72 is cut along the line B-B, thereby cutting the enclosure resin 2, the lead forming member 61, the pad forming member 62 and the anode frame 51 along the same plane. Further, the block body 72 is cut along the line C-C, thereby cutting the enclosure resin 2 and the cathode frame 52 along the same plane.

By performing the cutting step, a part of the tip end part 611 is cut off from the lead forming member 61 to form the anode lead 12, and thereby the capacitor element 1 is formed from the capacitor element body 71. Also, from the pad forming member 62, an end part on the opposite side to the lateral surface 62a is cut off to form the pad member 33, while, from the anode frame 51 and the cathode frame 52, respective parts thereof are cut off to form the anode terminal 3 and the cathode terminal 4, respectively.

On a cutting plane along the line B-B, formed are the tip end surface 12b of the anode lead 12, the second lateral surface 33b of the pad member 33, and the partial area 3b of the lateral end surface of the anode terminal 3, which are flush with each other (cf. FIG. 2).

In a case where an end of the lead forming member 61 does not reach a cutting position along the line B-B, even when the block body 72 is cut along the line B-B, the lead forming member 61 is not cut and the enclosure resin 2, the pad forming member 62, and the anode frame 51 are cut. In this case, the entire lead forming member 61 becomes the anode lead 12.

After performing the cutting step, a coating layer (not shown) including an insulation material is formed on the second lateral surface 33b of the pad member 33 and the tip end surface 12b of the anode lead 12. The solid electrolytic capacitor is thereby completed as shown in FIG. 1.

In the manufacturing method of the solid electrolytic capacitor described above, the joint part 30 of the pad forming member 62 and the anode frame 51 is formed at the position adjacent to the lateral surface 62a of the pad forming member 62 on the cathode frame 52 side. Therefore, even when the end part of the pad forming member 62 on the opposite side to the lateral surface 62a is cut off, the joint part 30 is not cut off. Thus, as shown in FIG. 2, the pad member 33 formed by performing the cutting step is kept electrically connected to the anode terminal 3 formed from the anode frame 51 through the joint part 30. Furthermore, because the pad member 33 is formed by cutting the pad forming member 62, the size of the pad member 33 is smaller than that of the pad forming member 62.

Therefore, according to the above described manufacturing method, a space factor of the capacitor element 1 improves in the produced solid electrolytic capacitor. Moreover, this solid electrolytic capacitor has a good electric connection between the pad member 33 and the anode terminal 3.

The present invention is not limited to the foregoing embodiment in construction but can be modified variously by one skilled in the art without departing from the spirit of the invention as set forth in the appended claims. For example, the configurations concerning the pad member 33 employed in the above described solid electrolytic capacitor including the lead type capacitor element and the manufacturing method thereof can be applied to a solid electrolytic capacitor including a foil-like capacitor element 8 as shown in FIG. 8.

Figure 8:
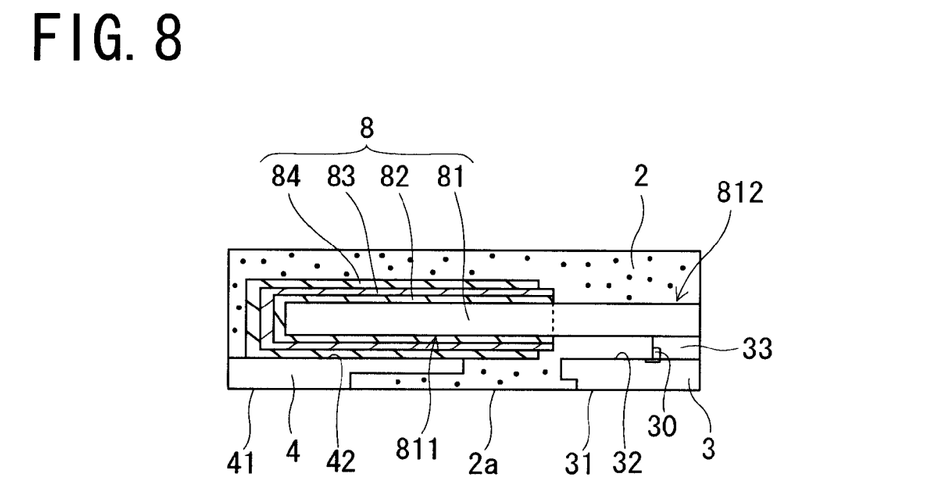
FIG. 8 is a cross sectional view showing a modification of the solid electrolytic capacitor.

As shown in FIG. 8, in the foil-like capacitor element 8, a surface of a foil-like anode body 81 includes a first area 811 where a dielectric layer 82 is formed and a second area 812 where the dielectric layer 82 is not formed. An electrolyte layer 83 is formed on the dielectric layer 82, and a cathode layer 84 is formed on the electrolyte layer 83. In the solid electrolytic capacitor element shown in FIG. 8, the tip end part of the pad member 33 is connected to the second area 812 on the surface of the anode body 81.

In the above described solid electrolytic capacitor and the manufacturing method thereof, the pad member 33 and the anode terminal 3 are joined to each other by laser welding. However, the present invention is not limited to this. For example, the pad member 33 and the anode terminal 3 may be joined to each other by bonding the facing surfaces thereof by a conductive adhesive.

What is claimed is:

1. A solid electrolytic capacitor comprising:
a solid electrolyte type capacitor element including a dielectric layer intervening between an anode section and a cathode section;
an anode terminal connected electrically to the anode section of the capacitor element through a pad member; and
a cathode terminal connected electrically to the cathode section of the capacitor element,
wherein on facing surfaces of the pad member and the anode terminal, a joint part which joins the pad member and the anode terminal electrically is formed at a position adjacent to a first lateral surface of the pad member located on the cathode terminal side,
wherein a second lateral surface of the pad member on the opposite side to the first lateral surface, a partial area of a lateral end surface of the anode terminal, and a first end surface of the anode section are flush with each other,
wherein a coating layer is formed on the second lateral surface of the pad member and the first end surface of the anode section, the coating layer having electrical insulating properties.

2. The solid electrolytic capacitor according to claim 1, wherein the joint part is formed by performing laser welding on the facing surfaces of the pad member and the anode terminal at the position adjacent to the first lateral surface of the pad member.

3. A method for manufacturing a solid electrolytic capacitor comprising: a solid electrolyte type capacitor element including a dielectric layer intervening between an anode section and a cathode section; an anode terminal connected electrically to the anode section of the capacitor element through a pad member; and a cathode terminal connected electrically to the cathode section of the capacitor element,
the method comprising the steps of:
joining an anode frame and a pad forming member by forming a joint part on facing surfaces of the pad forming member and the anode frame at a position adjacent to a lateral surface of the pad forming member on a cathode frame side, after providing the pad forming member on the anode frame, the anode frame being to be the anode terminal, the pad forming member being to be the pad member, and the cathode frame being to be the cathode terminal;
mounting the capacitor element on the anode frame and the cathode frame after performing the joining step, and thereafter connecting an anode forming member which is to be the anode section of the capacitor element to a tip end part of the pad forming member, and connecting the cathode section of the capacitor element to the cathode frame;
cutting off an end part of the pad forming member on the opposite side to the cathode frame, a part of the anode frame, and a part of the anode forming member such that cutting planes of the pad forming member, the anode frame, and the anode forming member are flush with each other, thereby forming the pad member, the anode terminal, and the anode section, after performing the mounting step; and
forming a coating layer on the cutting planes of the pad forming member and the anode forming member, the coating layer having electrical insulating properties.

4. The method for manufacturing a solid electrolytic capacitor according to claim 3, wherein in the cutting step, when cutting the end part of the pad forming member on the opposite side to the cathode frame, the pad forming member and the anode frame are cut along the same plane to form the pad member and the anode terminal.

5. The method for manufacturing a solid electrolytic capacitor according to claim 3, wherein in the joining step, the joint part is formed by performing laser welding on the facing surfaces of the pad forming member and the anode frame at the position adjacent to the lateral surface of the pad forming member on the cathode frame side.

* * * * *